US012375394B2

(12) United States Patent
Aflatoonian et al.

(10) Patent No.: US 12,375,394 B2
(45) Date of Patent: Jul. 29, 2025

(54) METHOD AND SYSTEM FOR FACILITATING MULTI-TENANCY ROUTING IN VIRTUAL PRIVATE CLOUD

(71) Applicant: Nutanix, Inc., San Jose, CA (US)

(72) Inventors: Amin Aflatoonian, Boulogne Billancourt (FR); Vimal Jagannatha Dharmavarapu, Bengaluru (IN); Theodore Elhourani, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 9 days.

(21) Appl. No.: 18/428,654

(22) Filed: Jan. 31, 2024

(65) Prior Publication Data

US 2025/0202803 A1 Jun. 19, 2025

(30) Foreign Application Priority Data

Dec. 19, 2023 (IN) ............................ 202341086726

(51) Int. Cl.

| | |
|---|---|
| ***H04L 45/00*** | (2022.01) |
| ***H04L 12/46*** | (2006.01) |
| ***H04L 12/66*** | (2006.01) |
| ***H04L 45/02*** | (2022.01) |
| ***H04L 45/586*** | (2022.01) |

(52) U.S. Cl.

CPC .............. *H04L 45/26* (2013.01); *H04L 45/04* (2013.01); *H04L 45/586* (2013.01)

(58) Field of Classification Search

CPC ....... H04L 45/26; H04L 45/04; H04L 45/586; H04L 12/911; H04L 12/46; H04L 12/66; H04L 45/00; H04L 45/02

USPC .......................................................... 709/238

See application file for complete search history.

(56) References Cited

U.S. PATENT DOCUMENTS

| | | | | |
|---|---|---|---|---|
| 8,549,518 | B1 | 10/2013 | Aron et al. | |
| 8,601,473 | B1 | 12/2013 | Aron et al. | |
| 8,850,130 | B1 | 9/2014 | Aron et al. | |
| 9,772,866 | B1 | 9/2017 | Aron et al. | |
| 11,456,894 | B1 * | 9/2022 | Sundararajan | H04L 12/4645 |
| 2022/0417060 | A1 * | 12/2022 | Sundararajan | H04L 12/4666 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Jude Jean Gilles

(57) ABSTRACT

A system for the isolation of routes in a network is provided. During operation, the system can receive subscription information indicating that a first virtual private cloud (VPC) of the network subscribes to a first route tag. Here, the subscription to a route tag can indicate that a subscriber is to receive routes associated with the route tag. The system can also receive, from a routing protocol instance of the network, a first route advertisement indicating a first route in the network. The first route advertisement can include the first route tag. The system can then determine, based on the first route tag in the route advertisement, that the first VPC subscribes to the first route tag. Accordingly, the system can provide the first route to the first VPC.

20 Claims, 8 Drawing Sheets

(56) References Cited

U.S. PATENT DOCUMENTS

2024/0095809 A1* 3/2024 Adogla .................. G06Q 50/40

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/ pp. all.
Poitras, Steven. "The Nutanix Bible" (Jan. 12, 2016), from https://nutanixbible.com/ pp. all.
Poitras, Steven. "The Nutanix Bible" (Jun. 9, 2016), from https://nutanixbible.com/ pp. all.
Poitras, Steven. "The Nutanix Bible" (Jan. 3, 2017), from https://nutanixbible.com/ pp. all.
Poitras, Steven. "The Nutanix Bible" (Jun. 8, 2017), from https://nutanixbible.com/ pp. all.
Poitras, Steven. "The Nutanix Bible" (Jan. 3, 2018), from https://nutanixbible.com/ pp. all.
Poitras, Steven. "The Nutanix Bible" (Jun. 25, 2018), from https://nutanixbible.com/ pp. all.
Poitras, Steven. "The Nutanix Bible" (Jan. 8, 2019), from https://nutanixbible.com/ pp. all.
Poitras, Steven. "The Nutanix Bible" (Jul. 25, 2019), from https://nutanixbible.com/ pp. all.
Poitras, Steven. "The Nutanix Bible" (Sep. 17, 2019), from https://nutanixbible.com/ pp. all.
Cano, Ignacio et al. "Curator: Self-Managing Storage for Enterprise Clusters"; University of Washington; published Mar. 2017; pp. all.
Poitras, Steven. "The Nutanix Bible" (Jan. 21, 2020), from https://nutanixbible.com/ pp. all.
Poitras, Steven. "The Nutanix Bible" (Sep. 14, 2020), from https://nutanixbible.com/ pp. all.
Poitras, Steven. "The Nutanix Bible" (Dec. 31, 2020), from https://nutanixbible.com/ pp. all.
Poitras, Steven. "The Nutanix Bible" (Jul. 27, 2022), from https://nutanixbible.com/ pp. all.
Poitras, Steven. "The Nutanix Bible" (Jan. 16, 2024), from https://nutanixbible.com/ pp. all.
Citrix XenDesktop 7.1 on Microsoft Hyper-V Server 2012 R2 on Nutanix Virtual Computing Platform, Solution Design, Jun. 25, 2014.
Poitras, Steven. "The Nutanix Bible" (Jan. 31, 2024), from https://nutanixbible.com/ pp. all.
"Practical Implementation of BGP Community with Geotags and Traffic Engineering based on Geotags" Muhammad Moinur Rahman.
https://www.coursehero.com/file/pcb90n1/There-must-be-security-group-rules-blocking-traffic-as-BGP-in-VPC-auto/ accessed Jan. 31, 2024.
https://repost.aws/knowledge-center/direct-connect-bgp-communities accessed Jan. 31, 2024.
https://learn.microsoft.com/en-us/azure/expressroute/expressroute-routing accessed Jan. 31, 2024.
https://docplayer.net/100524838-Nsx-t-data-center-administration-guide-vmware-nsx-t-data-center-2-3.html Downloaded Jan. 31, 2024.
https://www.cisco.com/c/en/us/solutions/collateral/data-center-virtualization/application-centric-infrastructure/guide-c07-743150.html Downloaded Jan. 31, 2024.
https://books.google.co.in/books?id=gl6JEAAAQBAJ&pg=PT171&lpg=PT171&dq=#v=onepage&q&f=false Accessed Jan. 31, 2024.
https://docs.aws.amazon.com/directconnect/latest/UserGuide/routing-and-bgp.html Downloaded Jan. 31, 2024.
https://aws.amazon.com/blogs/networking-and-content-delivery/creating-active-passive-bgp-connections-over-aws-direct-connect/ Downloaded Jan. 31, 2024.
https://www.juniper.net/documentation/us/en/software/junos/mpls/topics/ref/statement/vrf-target-edit-routing-instances-vp.html Accessed Jan. 31, 2024.
https://www.arubanetworks.com/techdocs/AOS-CX/AOSCX-CLI-Bank/cli_8400/Content/Chp_IVRL/IVRL_cmds/rou-tar-ivr.htm Accessed Jan. 31, 2024.

* cited by examiner

METHOD AND SYSTEM FOR FACILITATING MULTI-TENANCY ROUTING IN VIRTUAL PRIVATE CLOUD

RELATED APPLICATIONS

This application claims the benefit of Indian Provisional Application No. 202341086726, titled "Method and System for Facilitating Multi-Tenancy Routing in Virtual Private Cloud," by inventors Amin Aflatoonian, Vimal Jagannatha Dharmavarapu, and Theodore Elhourani, filed 19 Dec. 2023, the disclosure of which is incorporated by reference herein.

BACKGROUND

Field

The present disclosure relates to a communication network. More specifically, the present disclosure relates to methods and systems for facilitating multi-tenancy routing in virtual private clouds (VPCs).

Related Art

As network traffic becomes more diverse, virtualization can be utilized to segment network and computing infrastructure efficiently. In particular, the evolution of virtual computing has made multi-tenancy attractive and, consequently, placed additional requirements on the network. For example, many virtual machines (VMs) can be allocated to numerous tenants. It is often desirable for the network infrastructure to provide a large number of virtualized segments, such as virtual private clouds (VPCs), to support multi-tenancy and ensure network separation among the tenants. In general, a VPC deployed for a tenant can be referred to as a user VPC.

Typically, a respective user VPC can be deployed on an overlay network. Overlay networks have widely been used in various software-defined networking stacks in on-premise data centers as well as in public clouds. Overlay is a virtual or logical layer built on the underlay network. The constraints of the physical networking infrastructure do not bind these networks. Users have the flexibility to assign any Internet Protocol (IP) addresses to respective VMs based on their needs without having to update the physical network configuration. These IP addresses may not have a presence in the underlying network.

A respective user VPC can maintain routing protocol instances, such as border gateway protocol (BGP) instances, that establish routes among the devices in the user VPC. A route can be indicated by a prefix and a corresponding next hop. These devices are typically virtual or logical devices that share underlying physical resources. For example, the VMs deployed in a user VPC can be allocated IP addresses from a particular subnet. The routing protocol instances on the VMs can establish routes among them. However, to ensure communication outside of the user VPC, the routing protocol instances may need to exchange routing information with external routing protocol instances (e.g., with a public IP address or with another user VPC).

To facilitate exchange of external routing information, a corresponding transit VPC can be deployed with the user VPCs at a respective site. For example, a logical router of a user VPC can communicate with a logical router of the transit VPC, which can facilitate the exchange of routing information among the user VPCs. Generally, instead of exchanging routes to individual devices of a user VPC, the transit VPC (e.g., a logical device in the transit VPC) can exchange the prefixes representing subnets deployed in the user VPCs. Consequently, the transit VPC can serve as an intermediary to disseminate routing information and policies among the user VPCs, or between the user VPCs and networks via the routing protocol instances of the network.

SUMMARY

One embodiment of the present invention provides a system for the isolation of routes in a network. During operation, the system can receive subscription information indicating that a first virtual private cloud (VPC) of the network subscribes to a first route tag. Here, the subscription to a route tag can indicate that a subscriber is to receive routes associated with the route tag. The system can also receive, from a routing protocol instance of the network, a first route advertisement indicating a first route in the network. The first route advertisement can include the first route tag. The system can then determine, based on the first route tag in the route advertisement, that the first VPC subscribes to the first route tag. Accordingly, the system can provide the first route to the first VPC.

In a variation on this embodiment, the routing protocol instance can execute in a transit VPC that facilitates the exchange of routing information among a plurality of VPCs deployed in the network.

In a variation on this embodiment, the system can configure the routing protocol instance to distribute the first route with the first route tag.

In a variation on this embodiment, the system can store the subscription information associated with the first route tag in a data structure. Upon receiving the first route advertisement, the system can look up the first route tag in the data structure to determine that the first VPC subscribes to the first route tag.

In a variation on this embodiment, the system can configure a policy-based route (PBR) for the first VPC to allow traffic to and from the first VPC via the first route.

In a variation on this embodiment, the subscription information can also indicate that the first VPC subscribes to a second route tag. Here, the first route tag can be associated with routes advertised from the first VPC, and the second route tag can be associated with routes associated with a set of shared services.

In a variation on this embodiment, the system can receive a second route advertisement indicating a second route in the network. Here, the second route advertisement comprises the second route tag. The system can determine that the first VPC subscribes to the second route tag. The system can then provide the second route to the first VPC.

In a variation on this embodiment, the system can refrain from providing a third route associated with a third route tag to the first VPC. Here, the first VPC does not subscribe to the third route tag.

In a variation on this embodiment, the first route advertisement can be a Border Gateway Protocol (BGP) advertisement. The first route tag can then indicate a BGP community.

BRIEF DESCRIPTION OF THE FIGURES

In the figures, like reference numerals refer to the same figure elements.

DETAILED DESCRIPTION

Figure 1A:
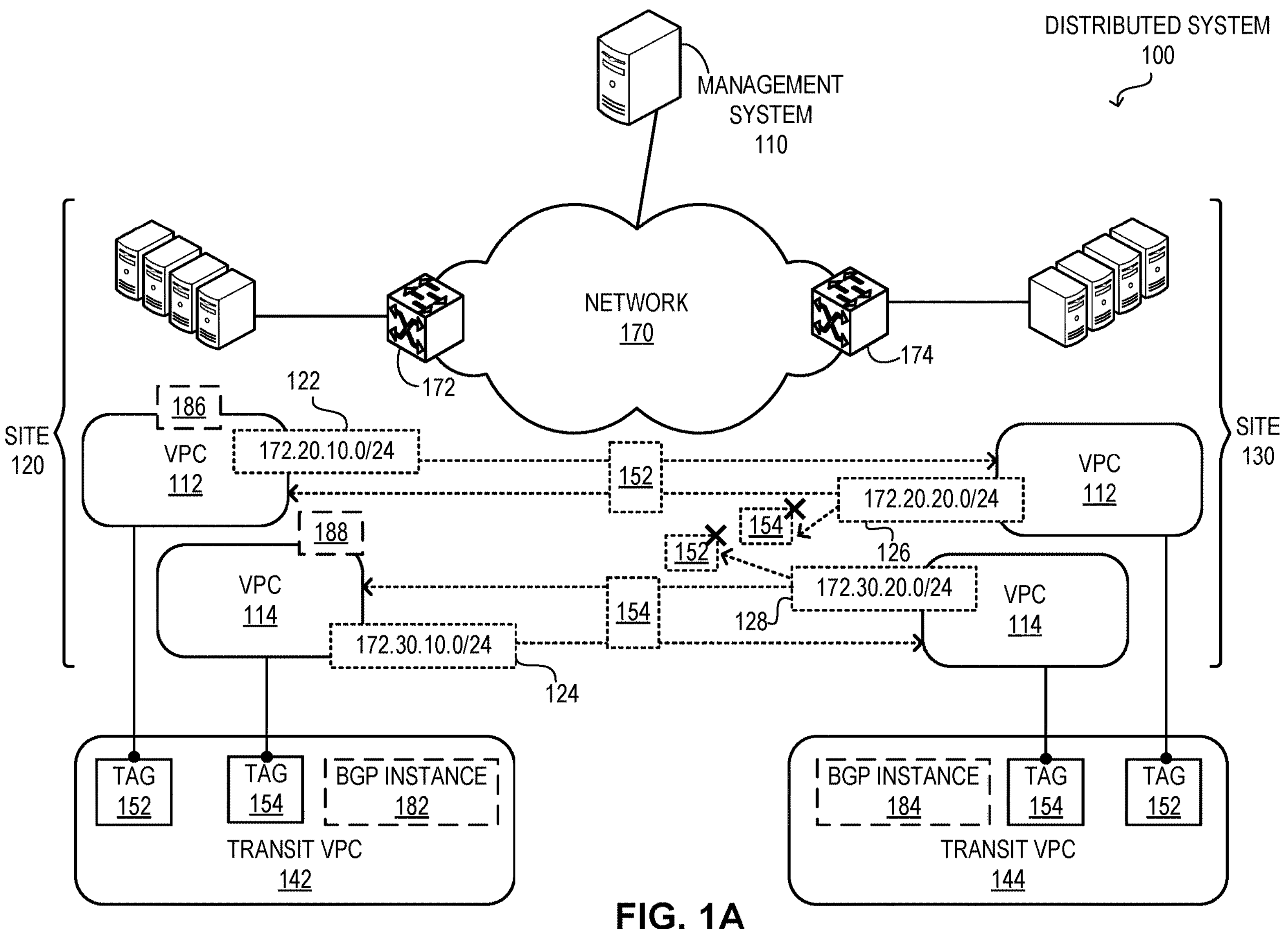
FIG. 1A illustrates an exemplary infrastructure that supports efficient isolation of routing information among VPCs, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently isolating routing information among VPCs in a multi-tenancy network by (i) associating routing information from a respective source (e.g., a VPC or a service type) with a corresponding route tag, (ii) distributing the routing information from the VPC with the route tag, and (iii) allowing a VPC to subscribe to a route tag to receive routing information from another VPC or an external peer corresponding to the subscribed route tag. Since a VPC can be associated with its own route tag, route advertisement from one portion of the VPC can reach another portion of the VPC. On the other hand, other VPCs may not receive such routing information unless the other VPCs are allowed to subscribe to the corresponding route tag. Consequently, the routing information can be isolated or shared among the user VPCs.

With existing technologies, a network can incorporate a number of computing devices coupled to each other via a network spanning one or more sites. The resources of the network can be allocated to one or more VPCs of corresponding tenants to support multi-tenancy. These VPCs can operate as a virtualized cloud infrastructure (e.g., contained within the network). The resources available in the network can be logically isolated and allocated to the VPCs of individual tenants, which are also referred to as user VPCs. Here, the computing, storage, networking, and software resources can be segmented and allocated to corresponding user VPCs. Consequently, the infrastructure segments and their operations can be separated among individual tenants.

A respective user VPC can include a number of virtual or logical devices, such as VMs and logical switches. One or more VMs of a user VPC can run on a hypervisor on a host (e.g., a server). The host can be a computing device deployed in the network. A management system (e.g., a controller of a software-defined network (SDN)) can manage and provision the hosts and the network. A set of flow rules received from the management system can be programmed on the host. These flow rules can include routes to devices within and outside of the user VPC. Such a flow rule can indicate how a packet destined to a route should be processed. For example, the flow rule can indicate whether the packet is to be forwarded or dropped and an egress port if the packet is to be forwarded.

The scope of the IP address space for a respective user VPC can be restricted within the user VPC. In other words, an IP address from the IP address space can be allocated to a VM deployed on that particular user VPC. For example, the IP address space of the user VPC can be a private IP space (e.g., accessible based on Network address translation (NAT)). Consequently, the IP addresses associated with the user VPC may not be usable outside of the user VPC (e.g., by the underlying infrastructure or another user VPC). As a result, the routes of a user VPC may not be pertinent to another user VPC. To send packets outside of the user VPC, the gateway logical switches (or border switches) of the user VPC can be programmed with the corresponding routes.

To facilitate communication outside of the user VPC, a corresponding transit VPC can be deployed with the user VPCs at a respective site. A respective transit VPC can include at least one logical router and a number of logical switches, and one or more routing protocol instances (e.g., BGP instances). These routing protocol instances can facilitate dynamic routing that can establish and update routes among them during runtime. The user VPC's logical router can execute a routing protocol instance that can also participate in the dynamic routing. In this way, the user VPCs at a site can become interconnected within a routing domain facilitated by the transit VPC of the site. This allows the logical routers in a user VPC to discover routes to logical devices in other user VPCs. In particular, the routing protocol instances of a user VPC can discover routes external to the user VPC in the virtual domain (i.e., at the logical devices of the VPC) without intervention from the underlying physical infrastructure.

However, the integration of routing domains by the transit VPC might compromise route isolation among the user VPCs. Since different user VPCs are typically associated with different tenants, the isolation of information among the VPCs can be important for tenant separation. In other words, isolating routes for individual tenants can be important for security, privacy, and efficient resource management. In addition, it can be undesirable for a tenant to share routing information with another tenant. Hence, if the isolation is compromised, there might be overlapping of tenant information, which can lead to challenges, such as interference and unauthorized access.

Furthermore, the logical routers of the transit VPC can also be coupled to upstream routers to ensure external communication (e.g., to the Internet). However, the absence of demarcation between routes associated with individual user VPCs may adversely impact the management and effective selection of routes. For example, even if an upstream router advertises a route pertinent to one user VPC, the advertised route may be advertised to other user VPCs logically coupled to the transit VPC. Therefore, impeded isolation of routing information among the user VPCs may compromise the integrity and performance of the multi-tenant framework of the network.

To solve this problem, a route advertisement in the network can be associated with a corresponding route tag. A respective route tag can represent a group of routes associated with certain characteristics or policies. The route tag can indicate specific attributes of the group of routes, such as routes belonging to a VPC, location, or service type. If the route advertisement is a BGP route advertisement, the route tag can be a BGP community tag. The community is a tag or attribute of BGP route advertisement that can be used to group routes together. A BGP community can also be used to control the flow of traffic and apply routing policies within and between autonomous systems (AS). By associating communities to routes, a network administrator may control how routes are propagated, advertised, and treated by the BGP instances (e.g., on BGP routers) in a network. A predetermined "community" field in a route advertisement can indicate that the community corresponds to a route tag. A "value" field of the community can then contain the value associated with the route tag.

The route tag can facilitate isolation of route information to the dynamic routing of the transit VPC. A respective user VPC can be associated with a corresponding route tag. Therefore, a respective route tag can be unique within the network (i.e., it is unique and can be allocated to only one entity, such as a user VPC). In some embodiments, the route tag can be allocated by the management system. In addition, a respective user VPC may subscribe to one or more route tags. When routes are advertised via the transit VPC, the user VPC may receive a route advertisement with a route tag if that user VPC has subscribed to that route tag. For example, the user VPC may subscribe to its own route tag. Consequently, a route advertisement can be exchanged between different sites within the user VPC via the transit VPC.

Moreover, a user VPC may also subscribe to one or more route tags associated with shared services. Suppose that a set of network services, such as firewall and load balancer, is shared among the user VPCs. The routing prefixes providing access to the shared services can be associated with a route tag. The user VPCs can then subscribe to this route tag and access these services. In this way, the route tag can facilitate the separation of routing information among user VPCs while ensuring that the user VPCs can continue to receive routing information of the shared services via the transit VPC.

During operation, when a user VPC advertises a route (e.g., using a BGP route advertisement) to the control plane of the network, the route advertisement can include the route tag associated with the user VPC. The control plane can be facilitated by a centralized entity, such as an SDN controller, or a set of distributed entities, such as a number of routing protocol instances, based on shared routing information. The route advertisement can then be distributed via the control plane. A user VPC may receive a route advertisement if the user VPC has subscribed to the corresponding route tag.

If the control plane is facilitated by the distributed entities, a set of routing protocol instances (e.g., BGP instances) can run on logical routers in the transit VPC and at least one logical router in each of the user VPCs. At a respective site, a user VPC (e.g., a logical router in the user VPC) can send a control message comprising subscription information to the transit VPC of the site. The subscription information can indicate the route tags to which the user VPC has subscribed. Upon receiving the subscription information, the logical router can add the subscription information to a subscription data structure and distribute the subscription information to the respective transit VPCs of other sites. In this way, a respective logical router can be aware of the subscription information of the user VPC.

The user VPC can also send a route advertisement comprising routing information associated with the user VPC. When a logical router in the transit VPC is to forward the route advertisement to another user VPC, the logical router can determine whether the user VPC has subscribed to the route tag (i.e., subscribed to receive route information associated with the route tag). If the user VPC has subscribed to the route tag, the logical router can forward the route advertisement to the user VPC (i.e., to a corresponding logical router of the user VPC). In this way, the user VPC may only receive route advertisements that are pertinent to the user VPC, such as route advertisements from a remote site of the user VPC or associated with shared services.

On the other hand, if the control plane is facilitated by the management system (e.g., an SDN controller), the user VPC (e.g., a logical router in the user VPC) can provide the route advertisement with a route tag to the management system. The user VPC may also provide subscription information to the management system. The user VPC may include the route advertisement and the subscription information in a control packet (e.g., an SDN control packet) and provide the control packet to the management system. Upon receiving the route advertisement and the subscription information, the management system can add the subscription information to a subscription data structure.

The management system can also provide a flow rule to a logical router, which may execute a routing protocol instance (e.g., a BGP gateway instance). The flow rule can program the logical router to advertise the routing information and associated route tag to peer routing protocol instances. The management system can also program the route indicated in the route advertisement at the logical router of the transit VPC. The logical router can then advertise the route and its associated route tag to the peer routing protocol instances (e.g., in the external network and other user VPCs). The advertisement can include an external address, which can be a public IP address, of the transit VPC as the next-hop address.

Furthermore, if the logical router receives a route advertisement from a peer routing protocol instance with a route tag, the logical router can provide the route information and the route tag of the route advertisement to the management system. The management system can check the subscription data structure to determine the user VPCs that have subscribed to the route tag. The management system can then publish the route indicated in the routing information to the user VPCs that have subscribed to the route tag. Publishing the route can include programming the route on the logical switches of these user VPCs (e.g., based on corresponding flow rules). In this way, the route tags can efficiently isolate routing information among a plurality of VPCs of different tenants.

In this disclosure, the term "packet" refers to a group of bits that can be transported together across a network. "Packet" should not be interpreted as limiting embodiments of the present invention to any networking layer. "Packet"

can be replaced by other terminologies referring to a group of bits, such as "message," "frame," "cell," or "datagram."

Network Architecture

FIG. 1A illustrates an exemplary infrastructure that supports efficient isolation of routing information among VPCs, in accordance with an embodiment of the present application. As illustrated in FIG. 1A, a distributed system 100 (e.g., a public cloud) can include a network 170 comprising routers 172 and 174. In some embodiments, one or more routers in network 170 can be virtual routers (e.g., a software router running on a computing device). Routers 172 and 174 can be coupled to sites 120 and 130, respectively, of distributed system 100. Sites 120 and 130 can include computing and networking resources on which respective instances of user VPCs 112 and 114 can execute.

In some embodiments, the virtual or logical devices of a respective user VPC can be configured, managed, and deployed from a management system 110. Management system 110 can be a controller of an SDN. Management system 110 can also be a virtualization manager. Examples of a virtualization manager include, but are not limited to, VMWare vCenter, Citrix XenCenter, and Microsoft Virtual Machine Manager. Management system 110 can have a view of the entire distributed system 100 (e.g., the network topology of network 170 and connectivity information of sites 120 and 130). Management system 110 can also provide flow rules that define how packets received at sites 120 and 130 can be forwarded. Management system 110 can then provide the flow rules to the logical routers of user VPCs 112 and 114.

User VPCs 112 and 114 may be associated with different tenants. For tenant isolation, routing and forwarding operations of user VPCs 112 and 114 can operate independently of each other. Each of user VPCs 112 and 114 can be associated with its own independent IP address space. Therefore, the scope of the IP address space for user VPC 112 can be restricted within that user VPC 112. Similarly, the scope of the IP address space for user VPC 114 can be restricted within that user VPC 114. Therefore, user VPCs 112 and 114 can both have a subnet A.B.C.0/24 (e.g., based on Classless Inter-Domain Routing (CIDR)). However, the corresponding IP address spaces can be isolated and restricted within corresponding user VPCs.

The IP address space of user VPCs 112 and 114 can be respective private IP spaces (e.g., accessible based on NAT). Consequently, the IP addresses associated with user VPC 112 may not be usable outside of user VPC 112 (e.g., by the underlying infrastructure of distributed system 100 or user VPC 114). As a result, the routes of user VPC 112 may not be pertinent to user VPC 114. Similarly, the routes of user VPC 114 may not be pertinent to user VPC 112. However, to send packets outside of user VPCs 112 and 114, respective gateway logical routers (or border routers) of user VPCs 112 and 114 may need to be programmed with the corresponding routes.

To facilitate communication outside of user VPCs 112 and 114, transit VPCs 142 and 144 can be deployed in sites 120 and 130, respectively. Each of transit VPCs 142 and 144 can include a number of logical routers running respective routing protocol instances, such as BGP instances 182 and 184. Here, BGP instances 182 and 184 can execute on logical devices of transit VPCs 142 and 144, respectively (not shown in FIG. 1A). BGP instances 182 and 184 may couple transit VPCs 142 and 144 sites 120 and 130, respectively. BGP instances 182 and 184 can facilitate dynamic routing that can establish and update routes among them during runtime. User VPCs 112 and 114 can become interconnected within a routing domain facilitated by transit VPCs 142 and 144 based on BGP instances 182 and 184, respectively. This allows the logical routers in user VPCs 112 and 114 to discover each other. In particular, BGP instances 182 and 184 can allow the routing protocol instances in user VPCs to discover routes in the virtual domain of transit VPCs 142 and 144 without intervention from the underlying physical infrastructure of distributed system 100.

However, the integration of routing domains by transit VPCs 142 and 144 can compromise the route isolation among user VPCs 112 and 114. Since user VPCs 112 and 114 can be associated with different tenants, the isolation of information among user VPCs 112 and 114 can be important for tenant separation. In other words, isolating routes for individual tenants can be important for security, privacy, and efficient resource management. In addition, it can be undesirable for a tenant to share routing information with another tenant. Hence, if the isolation of routing information of user VPCs 112 and 114 is compromised, there might be challenges, such as interference and unauthorized access.

Furthermore, the logical routers of transit VPCs 142 and 144 can also be logically coupled to upstream routers of network 170 to ensure external communication (e.g., to the Internet). However, the absence of demarcation between routes associated with user VPCs 112 and 114 may adversely impact the management and effective selection of routes. For example, even if an upstream router advertises a route pertinent to user VPC 112 at site 120, the advertised route may be advertised to user VPC 114 via transit VPC 142. Therefore, impeded isolation of routing information among user VPCs 112 and 114 may compromise the integrity and performance of the multi-tenant framework of distributed system 100.

To solve this problem, a respective route advertisement in distributed system 100 can be associated with a corresponding route tag. A respective route tag can represent a group of routes associated with certain characteristics or policies. Therefore, a respective route tag can be unique within distributed system 100 (i.e., it is not repeated and allocated to only one entity, such as a user VPC). For example, user VPCs 112 and 114 can be associated with route tags 152 and 154, respectively. Furthermore, route tags can be independent of a site. Consequently, a route advertisement from VPC 112 at site 120 or 130 can include route tag 152. If the route advertisement is a BGP route advertisement, the route tag can be a BGP community. A predetermined "community" field of the community can indicate that the community corresponds to a route tag. A "value" field of the community can then indicate the value representing the route tag.

Route tags 152 and 154 can facilitate the isolation of route information to the dynamic routing of transit VPCs 142 and 144. In some embodiments, route tags 152 and 154 can be allocated to user VPCs 112 and 114, respectively, by management system 110. In addition, user VPCs 112 and 114 may subscribe to one or more route tags. For example, user VPCs 112 and 114 may subscribe to their own route tags 152 and 154, respectively. Accordingly, when a route is advertised via transit VPCs 142 and 144, user VPC 112 may receive the route advertisement with route tag 152. Similarly, user VPC 114 may receive the route advertisement with route tag 154. Consequently, a route advertisement can be exchanged between sites 120 and 130 of user VPCs 112 and 114 via transit VPCs 142 and 144, respectively.

For example, VPC 112 can include a route 122 (e.g., 172.20.10.0/24) at site 120 and another route 126 (e.g., 172.20.20.0/24). Both routes 122 and 126 can then be associated with route tag 152. As a result, when route 122 is advertised through transit VPC 142 from site 120, route 122 is advertised from BGP instance 182 of transit VPC 142 to BGP instance 184 of transit VPC 144. Subsequently, route 122 can be distributed in VPC 112 via transit VPC 144 at site 130. Moreover, VPC 114 can include a route 124 (e.g., 172.30.10.0/24) at site 120 and another route 128 (e.g., 172.30.20.0/24). Both routes 124 and 128 can then be associated with route tag 154. As a result, when route 124 is advertised through transit VPC 142 from site 120 to transit VPC 144, route 124 is distributed in VPC 114 through transit VPC 144 at site 130.

Similarly, when route 126 is advertised through transit VPC 144 from site 130 to transit VPC 142, route 126 is distributed in VPC 112 through transit VPC 142 at site 120. When route 128 is advertised through transit VPC 144 from site 130 to transit VPC 142, route 128 is distributed in VPC 114 at site 120. Because the distribution of routes is based on route tags 152 and 154, a route is not advertised without a subscription. Since user VPC 114 may not subscribe to route tag 152, route 126 is not distributed in VPC 114 at site 120 via transit VPC 144 (denoted with a cross). In the same way, since user VPC 112 may not subscribe to route tag 154, route 128 is not distributed in VPC 112 at site 120 via transit VPC 144 (denoted with a cross).

User VPCs 112 and 114 can advertise these routes with route tags 152 and 154, respectively, to the control plane of distributed system 100. The control plane can be facilitated by management system 100 (e.g., an SDN controller), or a set of distributed entities, such as a number of routing protocol instances, based on shared routing information. The route advertisement can then be distributed via the control plane.

If the control plane is facilitated by the distributed entities, BGP instances 182 and 184 of transit VPCs 142 and 144, respectively, can communicate with BGP instances of user VPCs 112 and 114. For example, at site 120, BGP instances 186 and 188 of user VPCs 112 and 114, respectively, can exchange routing information with BGP instance 182. When BGP instance 182 is to forward a route advertisement with route tag 152 to site 120, BGP instance 182 can determine whether user VPCs 112 and 114 have subscribed to route tag 152. Since user VPC 112 has subscribed to route tag 152, BGP instance 182 can forward the route advertisement to BGP instance 186 and may refrain from forwarding it to BGP instance 188. In this way, user VPC 112 at site 120 may only receive route advertisements that are pertinent to user VPC 112, such as route advertisements from site 130.

On the other hand, if the control plane is facilitated by management system 110, user VPCs 112 and 114 can provide the route advertisements with route tags 152 and 154, respectively, to management system 110. User VPC 112 and 114 may also provide subscription information to management system 110. Upon receiving the subscription information, management system 110 can add the subscription information to a subscription data structure. For a route advertisement from user VPC 112 at site 120 (e.g., route 122), management system 110 can program BGP instance 182 to distribute the route advertisements with route tag 152 to peer BGP instances.

When peer BGP instance 184 receives a route advertisement with a route tag 152 from BGP instance 182, it can provide the route advertisement to management system 110. Subsequently, management system 110 can determine which user VPCs have subscribed to route tag 152. Accordingly, management system 110 can determine that user VPC 112 has a subscription to route tag 152. Therefore, management system 110 can publish the route (e.g., route 122) to user VPC 112 at site 130. In this way, distributed system 100 can facilitate the isolation of route information between user VPCs 112 and 114.

Figure 1B:
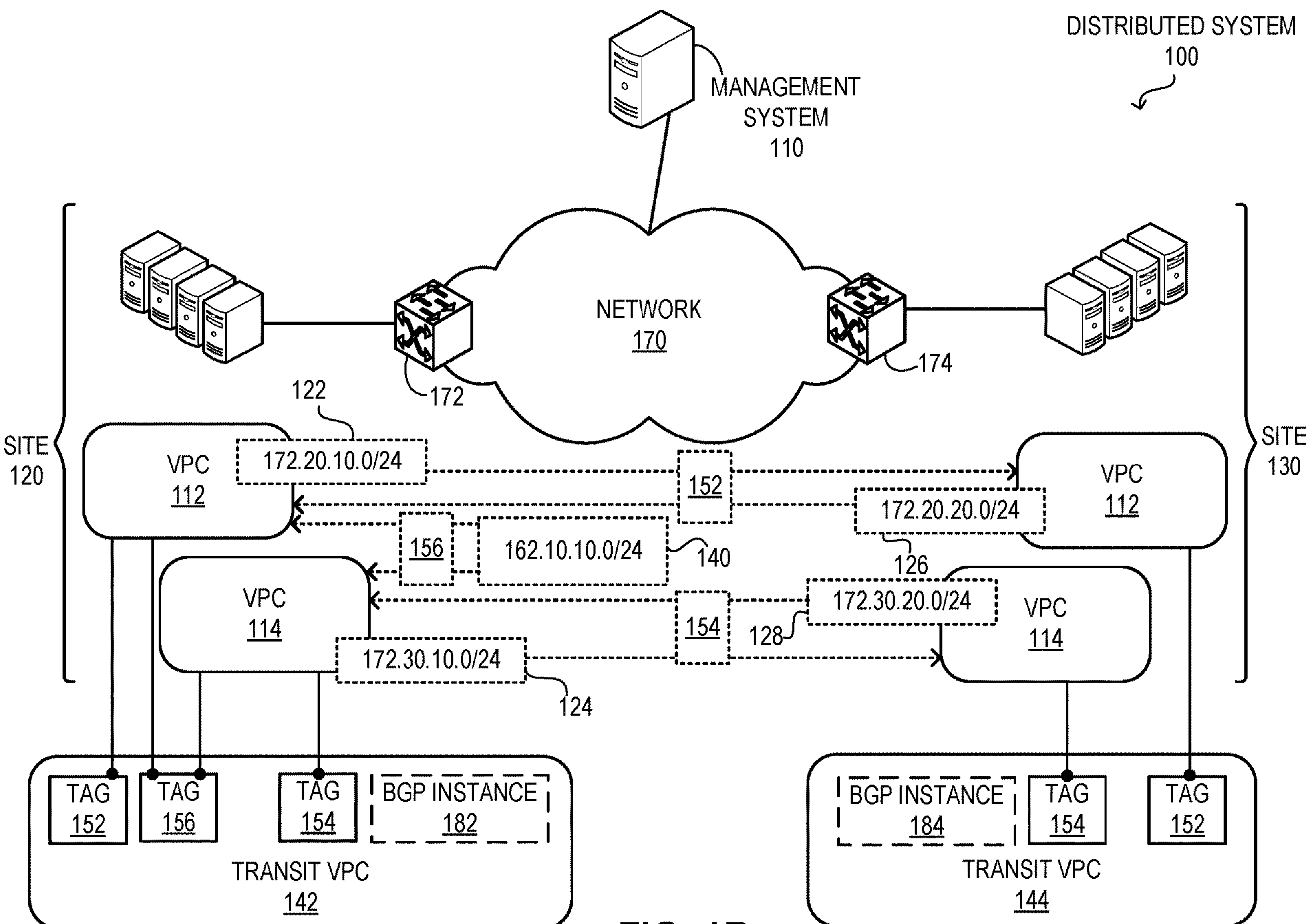
FIG. 1B illustrates exemplary subscription of routing information in a multi-VPC environment, in accordance with an embodiment of the present application.

FIG. 1B illustrates exemplary subscription of routing information in a multi-VPC environment, in accordance with an embodiment of the present application. One or more sites of distributed system 100 can facilitate services shared among VPCs 112 and 114. Suppose that a set of services, such as firewall and load balancing, is shared among user VPCs 112 and 114. These services can be accessed via a routing prefix (e.g., 162.10.10.0/24). Therefore, route 140 advertising this routing prefix should be received by user VPCs 112 and 114 to access the services. Therefore, while ensuring the isolation of routing information among user VPCs 112 and 114, access to some other routing information should be shared among user VPCs 112 and 114.

Accordingly, the routing prefix, which can be 162.10.10.0/24 in this example, providing access to the shared services in distributed system 100 can be associated with a route tag 156. Both user VPCs 112 and 114 can then subscribe to route tag 156. As a result, when route 140 is advertised via transit VPC 142, both user VPCs 112 and 114 can receive the route. This allows user VPCs 112 and 114 to receive routing information of the shared services via transit VPC 142. Furthermore, a respective user VPC can subscribe to a plurality of route tags. For example, VPC 112 can subscribe to route tag 152 for its own routes and route tag 156 for routes to shared services. Similarly, VPC 114 can subscribe to route tag 154 for its own routes and route tag 156 for routes to shared services.

Isolation of Routing Information Among VPCs

Figure 2:
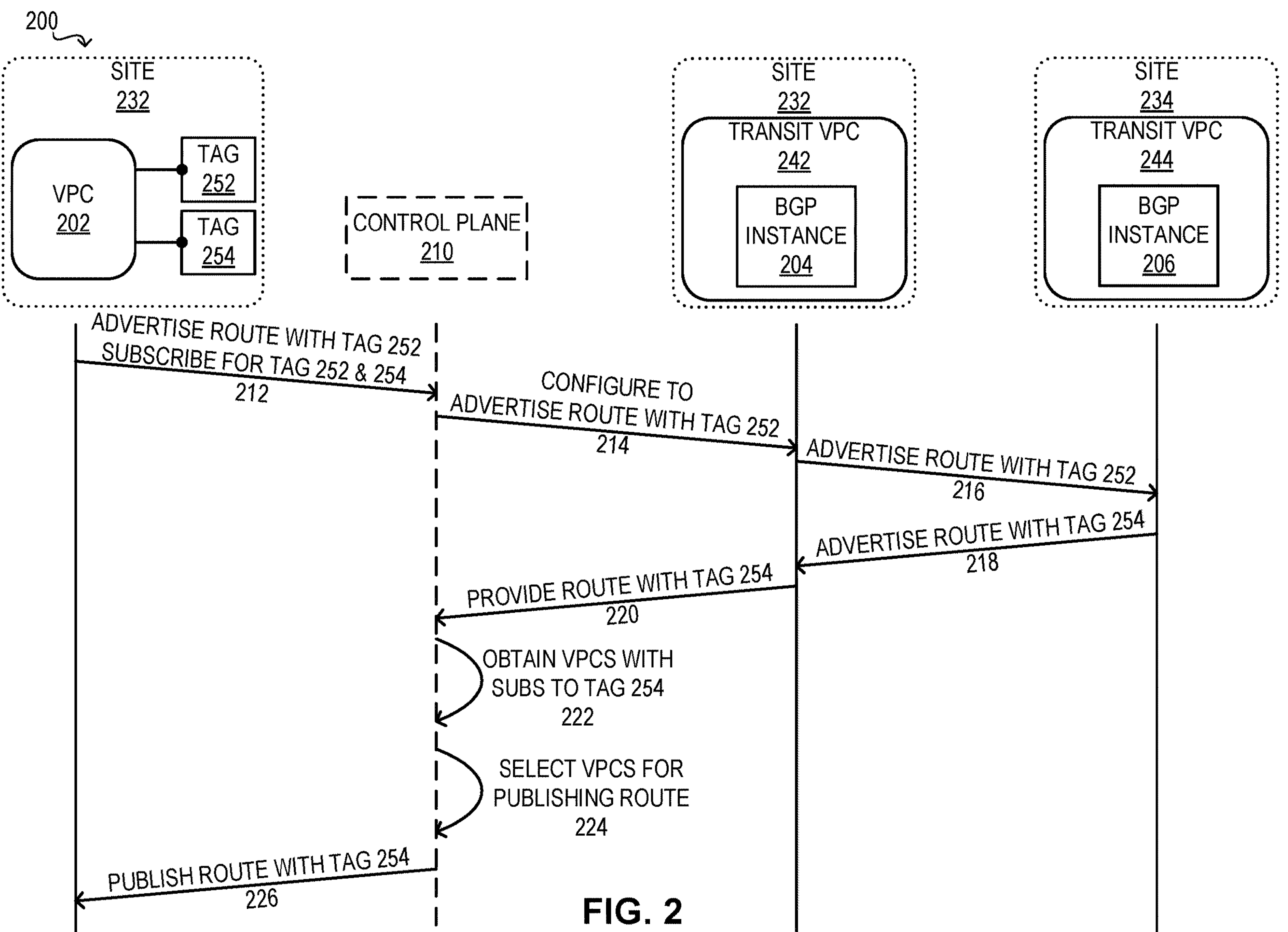
FIG. 2 illustrates exemplary communication facilitating efficient distribution of routing information based on subscriptions, in accordance with an embodiment of the present application.

FIG. 2 illustrates exemplary communication facilitating efficient distribution of routing information based on subscriptions, in accordance with an embodiment of the present application. A site 232 of a distributed system 200 can include a user VPC 202. To facilitate communication outside of user VPC 202, a transit VPC 242 can be deployed at site 232. Another transit VPC 242 can be deployed at site 234 in distributed system 200. Each of transit VPCs 242 and 244 can include a number of logical routers running respective routing protocol instances. For example, BGP instances 204 and 206 can be executed on transit VPCs 242 and 244, respectively. Here, BGP instances 204 and 206 can execute on logical devices of transit VPCs 242 and 244, respectively (not shown in FIG. 2). BGP instances 204 and 206 can facilitate dynamic routing that can establish and update routes among them during runtime. User VPC 202 can become interconnected within a routing domain facilitated by transit VPCs 242 and 244 based on BGP instances 204 and 206, respectively.

BGP instances 204 and 206 can allow the routing protocol instances in user VPC 202 to discover routes in the virtual domain of transit VPCs 242 and 244 without intervention from the underlying physical infrastructure of distributed system 200. To receive routes pertinent to user VPC 202 via transit VPC 242, user VPC 202 may subscribe to route tags 252 and 254. Here, route tag 252 can be associated with user VPC 202, and route tag 252 can be associated with a set of shared services. Accordingly, when routes are advertised via transit VPC 242, user VPC 112 may receive the route advertisements with route tags 252 and 254.

User VPC 202 can advertise routes with route tag 252 to control plane 210 of distributed system 200. Control plane 210 can be facilitated by management system 200 (e.g., an SDN controller), or a set of distributed entities, such as a number of routing protocol instances, based on shared routing information. The route advertisement can then be distributed via control plane 210. During operation, user VPC 202 (e.g., a logical router in user VPC 202) can advertise a route with route tag 202 to control plane 210 (e.g., using a control packet to the controller of distributed system 200). User VPC 202 can also provide subscription information, which can indicate subscription to route tags 252 and 254, to control plane 210 (operation 212).

Upon receiving the route advertisement and the subscription information, the subscription information can be added to a subscription data structure maintained in control plane 210. Control plane 210 can configure (or program) BGP instance 204 to advertise routes with route tag 252 (operation 214). For example, the controller of distributed system 200 can provide a flow rule to the logical router executing BGP instance 204 to program the logical router to advertise the route and associated route tag 252 to peer BGP instances, such as BGP instance 206. Accordingly, BGP instance 204 can advertise the route with route tag 252 to its peer BGP instance 206 (operation 216). The advertisement can include an external address, which can be a public IP address, of transit VPC 242 as the next-hop address.

Similarly, BGP instance 206 can advertise a route with route tag 254 to its peer BGP instance 204 (operation 218). When BGP instance 204 receives the route advertisement with route tag 254, BGP instance 204 can provide the route information indicating the route and route tag 254 to control plane 210 (operation 220). A list of user VPCs with a subscription to route tag 254 can then be determined at control plane 210 (operation 222). Accordingly, control plane 210 can select the user VPCs for publishing (or distributing) the route (operation 224). For example, the management system can check the subscription data structure to select the user VPCs that have subscribed to route tag 254.

Control plane 210 can then publish the route indicated in the routing information to user VPC 202 since it has subscribed to route tag 254 (operation 226). Publishing the route can include programming the route on one or more logical routers of user VPC 202 (e.g., based on corresponding flow rules). In particular, if user VPC 202 is logically coupled to transit VPC 242, the management system can program the logical routers of transit VPC 242 with the route, allow traffic to user VPC 202 via the route, and update a list of routes of user VPC 202 with the route. To allow traffic to user VPC 202 via the route, the management system may program a policy-based route (PBR) to the logical routers of user VPC 202. On the other hand, if user VPC 202 is logically coupled to an external network, the management system can program the logical routers of user VPC 202 with the route and update a list of routes of user VPC 202 with the route.

Operations

Figure 3A:
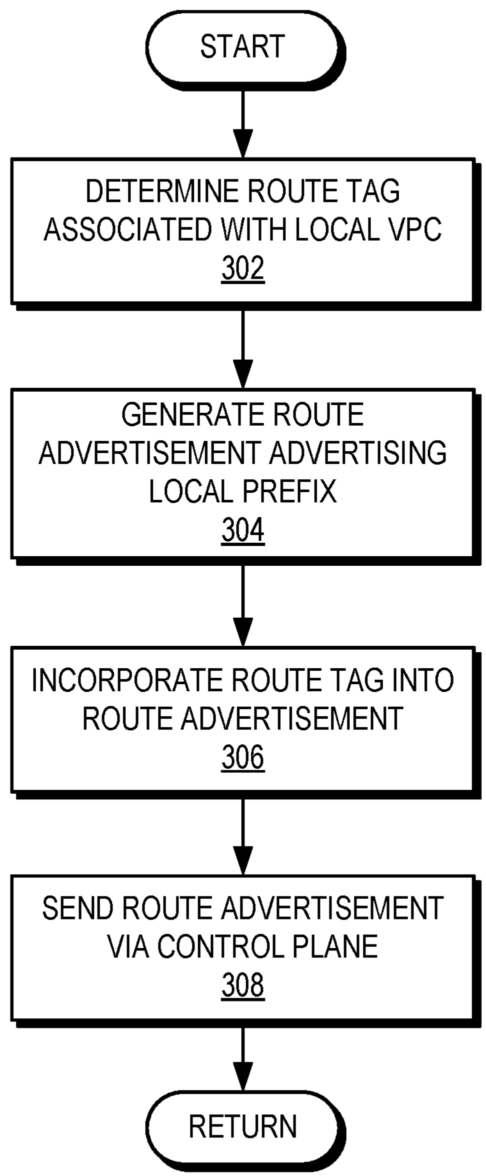
FIG. 3A presents a flowchart illustrating a method of a user VPC distributing routing information with a route tag of the user VPC, in accordance with an embodiment of the present application.

FIG. 3A presents a flowchart illustrating a method of a user VPC distributing routing information with a route tag of the user VPC, in accordance with an embodiment of the present application. A logical device, such as a logical switch or router, of the user VPC may perform the method. During operation, the user VPC can determine a route tag associated with the user VPC (operation 302). The user VPC can generate a route advertisement advertising the local prefix (operation 304). The prefix can correspond to an IP subnet (e.g., a range of IP addresses) from which the logical devices of the user VPC can obtain IP addresses. The user VPC can also incorporate the route tag into the route advertisement (operation 306). If the route advertisement is a BGP advertisement, the route tag can be a community. The user VPC can then send the route advertisement via the control plane (e.g., to the controller) (operation 308).

Figure 3B:
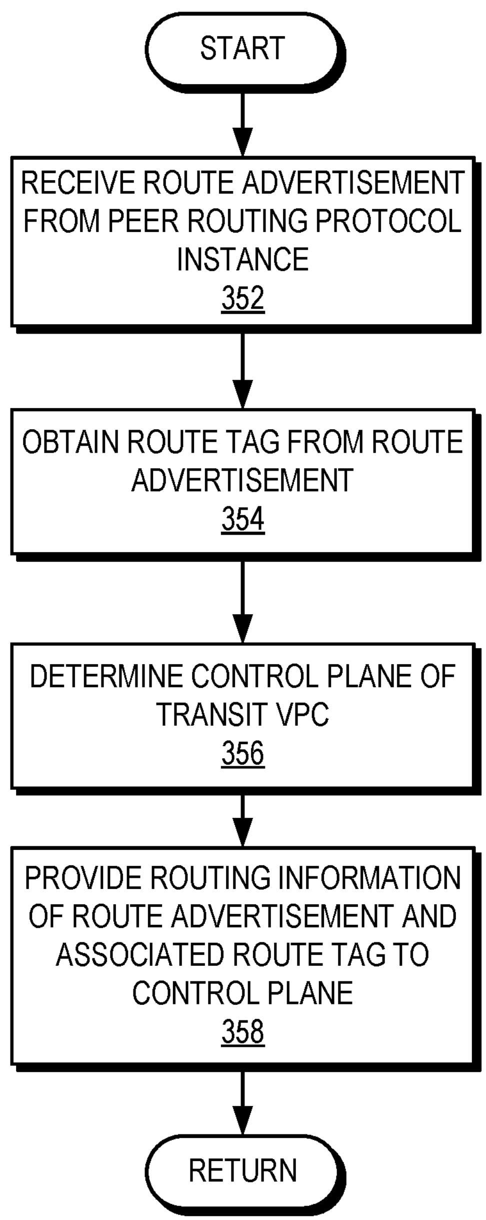
FIG. 3B presents a flowchart illustrating a method of a routing protocol instance in a transit VPC proving routing information via a control plane, in accordance with an embodiment of the present application.

FIG. 3B presents a flowchart illustrating a method of a routing protocol instance in a transit VPC proving routing information via a control plane, in accordance with an embodiment of the present application. During operation, the routing protocol instance (e.g., a BGP instance) can receive a route advertisement from a peer routing protocol instance (operation 352) and obtain (or retrieve) a route tag from the route advertisement (operation 354). If the route advertisement is a BGP advertisement, the route tag can be obtained from a community field of the BGP advertisement. The routing protocol instance can then determine a control plane of the transit VPC (operation 356).

Subsequently, the routing protocol instance can provide the routing information of the route advertisement and associated route tag to the control plane (operation 358). In some embodiments, the control plane can be facilitated by an SDN controller. Determining the control plane can then include identifying the controller, and providing information to the control plane can include sending a control packet comprising the information to the controller.

Figure 4:
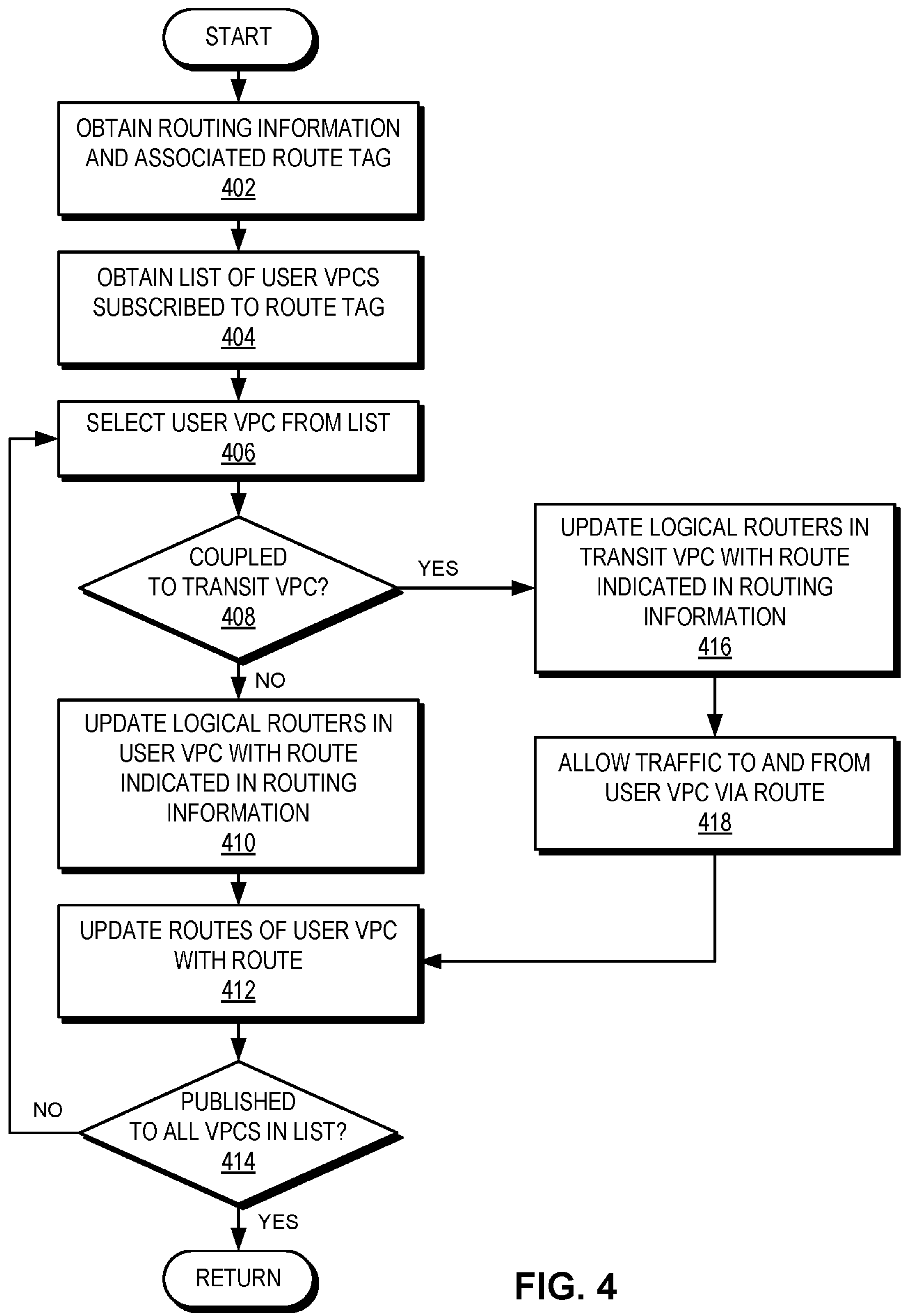
FIG. 4 presents a flowchart illustrating a method of a controller distributing routing information via a control plane based on a corresponding route tag, in accordance with an embodiment of the present application.

FIG. 4 presents a flowchart illustrating a method of a controller distributing routing information via a control plane based on a corresponding route tag, in accordance with an embodiment of the present application. During operation, the controller can obtain routing information and an associated route tag (e.g., from a user VPC) (operation 402). The controller can then obtain a list of user VPCs subscribed to the route tag (operation 404) and select a user VPC from the list (operation 406). A user VPC subscribing to a route tag can indicate that the user VPC should receive routes advertised with the route tag. The controller can maintain a data structure (e.g., a table) with the subscription information of a respective user VPC. The controller can generate the list by looking up the route tag in the data structure and determining the user VPCs mapped to the route tag in the data structure.

The controller can then determine whether the selected user VPC is logically coupled to a transit VPC (operation 408). If the user VPC is not logically coupled to the transit VPC, the user VPC can be coupled to an external network. The controller can then update the logical routers in the user VPC with a route indicated in the routing information (operation 410). On the other hand, if the user VPC is logically coupled to the transit VPC, the controller can then update the logical routers in the transit VPC with the route indicated in the routing information (operation 416). The controller can also allow traffic to and from the user VPC via the route (operation 418). The controller may configure a PBR to allow the transfer of traffic via the route.

Upon updating the logical routers in the user VPC (operation 410) or allowing traffic via the route (operation 418), the controller can update the routes of the user VPC (e.g., in a received routes list of the user VPC) with the route (operation 412). The controller can then determine whether the route is published to all VPCs in the list (operation 414). If the route is not published to all VPCs in the list, the controller can continue to select another user VPC from the list (operation 406). In this way, the controller can provide the route to a respective user VPC that has subscribed to the route tag.

Exemplary Computer System and Apparatus

Figure 5:
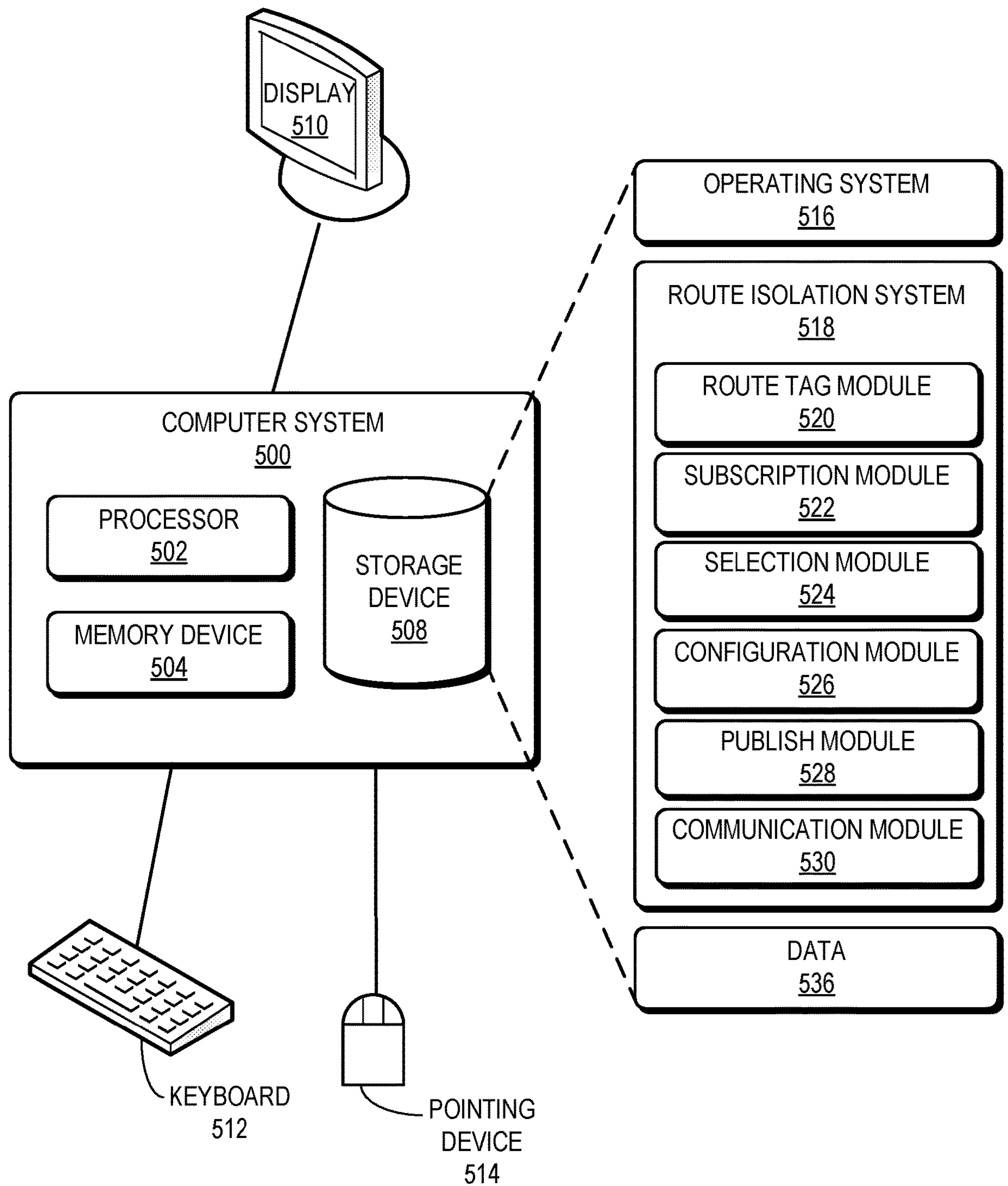
FIG. 5 illustrates an exemplary computer system that facilitates efficient isolation of routing information among VPCs, in accordance with an embodiment of the present application.

FIG. 5 illustrates an exemplary computer system that facilitates efficient isolation of routing information among VPCs, in accordance with an embodiment of the present application. Computer system 500 includes a processor 502, a memory 504, and a storage device 508. Memory 504 can include a volatile memory (e.g., a dual in-line memory module (DIMM)). Furthermore, computer system 500 can be coupled to a display device 510, a keyboard 512, and a pointing device 514. Storage device 508 can store an operating system 516, a route isolation system 518, and data 536.

Route isolation system 518 can include instructions, which, when executed by computer system 500, can cause computer system 500 to perform methods and/or processes described in this disclosure. Specifically, Route isolation system 518 can include instructions for allocating a route tag to a pertinent entity, such as a user VPC and a set of services (route tag module 520). Route isolation system 518 can also include instructions for obtaining information indicating subscription to one or more route tags (e.g., from a user VPC) (subscription module 522).

Route isolation system 518 can also include instructions for selecting a set of user VPCs subscribing to a route tag for publishing a route (e.g., from a subscription data structure) (selection module 524). In addition, route isolation system 518 can include instructions for configuring logical routers of a VPC with a route (configuration module 526). Furthermore, route isolation system 518 can include instructions for publishing a route to a selected user VPC (publish module 528). Route isolation system 518 can also include instructions for sending and receiving layer-2 and/or layer-3 packets (e.g., SDN control packets) (communication module 530).

Data 536 can include any data that is required as input, or that is generated as output by the methods and/or processes described in this disclosure. Specifically, data 536 can store at least: a subscription data structure, flow rules for configuring a logical switch, flow rules for configuring a PBR, and list of received routes of a respective user VPC.

Figure 6:
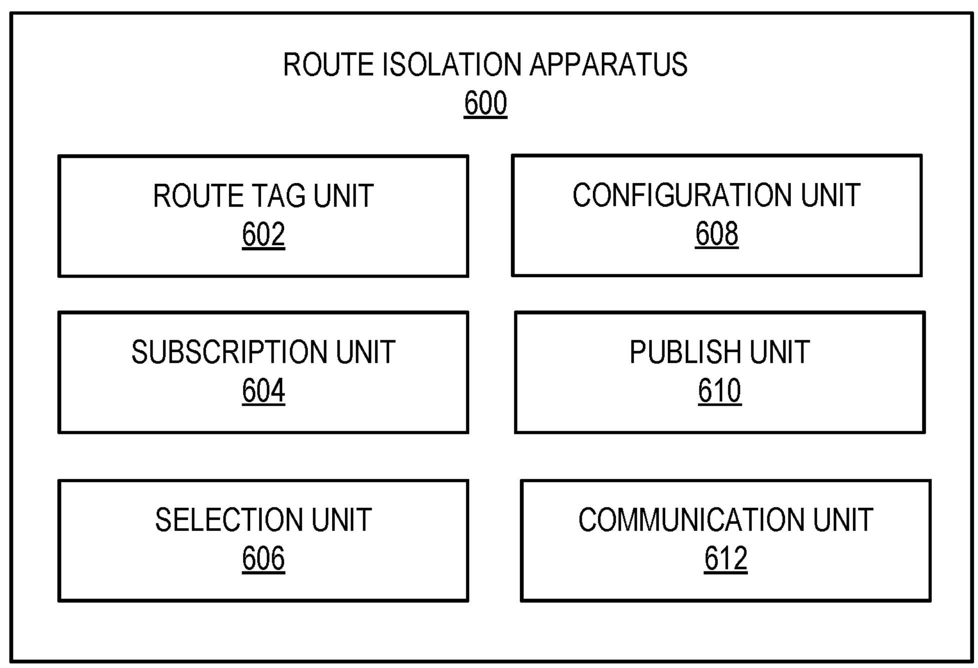
FIG. 6 illustrates an exemplary apparatus that facilitates efficient isolation of routing information among VPCs, in accordance with an embodiment of the present application.

FIG. 6 illustrates an exemplary apparatus that facilitates efficient isolation of routing information among VPCs, in accordance with an embodiment of the present application. A route isolation apparatus 600 can comprise a plurality of units or apparatuses that may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Apparatus 600 may also be a virtual device (e.g., a VM, a hypervisor, etc.).

Specifically, apparatus 600 can comprise units 602-612, which perform functions or operations similar to modules 520-530 of computer system 500 of FIG. 5, including: a route tag unit 602; a subscription unit 604; a selection unit 606; a configuration unit 608; a publish unit 610; and a communication unit 612.

Note that the above-mentioned modules can be implemented in hardware as well as in software. In one embodiment, these modules can be embodied in computer-executable instructions stored in a memory which is coupled to one or more processors in computer system 500 and/or apparatus 600. When executed, these instructions cause the processor(s) to perform the aforementioned functions.

In summary, embodiments of the present invention provide a system and a method for the isolation of routes in a network. In one embodiment, the system can receive subscription information indicating that a first virtual private cloud (VPC) of the network has subscribed to a first route tag. Here, the subscription to a route tag can indicate that a subscriber is to receive routes associated with the route tag. The system can also receive, from a routing protocol instance of the network, a first route advertisement indicating a first route in the network. The first route advertisement can include the first route tag. The system can then determine, based on the first route tag in the route advertisement, that the first VPC has subscribed to the first route tag. Accordingly, the system can provide the first route to the first VPC.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating isolation of routes in a network, the method comprising:

receiving, by a computing system in the network, subscription information indicating that a first virtual private cloud (VPC) of the network subscribes to a first route tag, wherein subscription to a respective route tag indicates that a subscriber is to receive routes associated with the route tag;

receiving, from a routing protocol instance of the network, a first route advertisement indicating a first route in the network, wherein the first route advertisement comprises the first route tag;

determining, based on the first route tag in the route advertisement, that the first VPC subscribes to the first route tag; and providing the first route to the first VPC.

2. The method of claim 1, wherein the routing protocol instance executes in a transit VPC that facilitates exchange of routing information among a plurality of VPCs deployed in the network.

3. The method of claim 1, further comprising configuring the routing protocol instance to distribute the first route with the first route tag.

4. The method of claim 1, further comprising:

storing the subscription information associated with the first route tag in a data structure; and in response to receiving the first route advertisement, looking up the first route tag in the data structure to determine that the first VPC subscribes to the first route tag.

5. The method of claim 1, further comprising configuring a policy-based route (PBR) for the first VPC to allow traffic to and from the first VPC via the first route.

6. The method of claim 1, wherein the subscription information further indicates that the first VPC subscribes to a second route tag, wherein the second route tag is associated with routes associated with a set of shared services.

7. The method of claim 6, further comprising:
- receiving a second route advertisement indicating a second route in the network, wherein the second route advertisement comprises the second route tag;
- determining that the first VPC subscribes to the second route tag; and
- providing the second route to the first VPC.

8. The method of claim 1, further comprising refraining from providing a third route associated with a third route tag to the first VPC, wherein the first VPC does not subscribe to the third route tag.

9. The method of claim 1, wherein the first route advertisement is a Border Gateway Protocol (BGP) advertisement, and wherein the first route tag indicates a BGP community.

10. A non-transitory computer-readable storage medium storing instructions that when executed by a computer cause the computer to perform a method for facilitating isolation of routes in a network, the method comprising:
- receiving subscription information indicating that a first virtual private cloud (VPC) of the network subscribes to a first route tag, wherein subscription to a respective route tag indicates that a subscriber is to receive routes associated with the route tag;
- receiving, from a routing protocol instance of the network, a first route advertisement indicating a first route in the network, wherein the first route advertisement comprises the first route tag;
- determining, based on the first route tag in the route advertisement, that the first VPC subscribes to the first route tag; and
- providing the first route to the first VPC.

11. The non-transitory computer-readable storage medium of claim 10, wherein the routing protocol instance executes in a transit VPC that facilitates exchange of routing information among a plurality of VPCs deployed in the network.

12. The non-transitory computer-readable storage medium of claim 10, wherein the method further comprises configuring the routing protocol instance to distribute the first route with the first route tag.

13. The non-transitory computer-readable storage medium of claim 10, wherein the method further comprises:
- storing the subscription information associated with the first route tag in a data structure; and
- in response to receiving the first route advertisement, looking up the first route tag in the data structure to determine that the first VPC subscribes to the first route tag.

14. The non-transitory computer-readable storage medium of claim 10, wherein the method further comprises configuring a policy-based route (PBR) for the first VPC to allow traffic to and from the first VPC via the first route.

15. The non-transitory computer-readable storage medium of claim 10, wherein the subscription information further indicates that the first VPC subscribes to a second route tag, wherein the second route tag is associated with routes associated with a set of shared services.

16. The non-transitory computer-readable storage medium of claim 15, wherein the method further comprises:
- receiving a second route advertisement indicating a second route in the network, wherein the second route advertisement comprises the second route tag;
- determining that the first VPC subscribes to the second route tag; and
- providing the second route to the first VPC.

17. The non-transitory computer-readable storage medium of claim 10, wherein the method further comprises refraining from providing a third route associated with a third route tag to the first VPC, wherein the first VPC does not subscribe to the third route tag.

18. The non-transitory computer-readable storage medium of claim 10, wherein the first route advertisement is a Border Gateway Protocol (BGP) advertisement, and wherein the first route tag indicates a BGP community.

19. A computing system, comprising:
- a processor; and
- a memory coupled to the processor and storing instructions, which when executed by the processor cause the processor to perform a method for facilitating isolation of routes in a network, the method comprising:
  - receiving subscription information indicating that a first virtual private cloud (VPC) of the network subscribes to a first route tag, wherein subscription to a respective route tag indicates that a subscriber is to receive routes associated with the route tag;
  - receiving, from a routing protocol instance of the network, a first route advertisement indicating a first route in the network, wherein the first route advertisement comprises the first route tag;
  - determining, based on the first route tag in the route advertisement, that the first VPC subscribes to the first route tag; and
  - providing the first route to the first VPC.

20. The computing system of claim 19, wherein the subscription information further indicates that the first VPC subscribes to a second route tag, wherein the second route tag is associated with routes associated with a set of shared services.

* * * * *